United States Patent [19]
Meijers

[11] 3,762,034
[45] Oct. 2, 1973

[54] METHOD OF PLUGGING A PIPE OR BORE ACCESSIBLE OF ONE SIDE ONLY

[75] Inventor: Johannes E. Meijers, 's- Gravenhage, Netherlands

[73] Assignee: N. V. Neratoom, The Hague, Netherlands

[22] Filed: Mar. 10, 1972

[21] Appl. No.: 233,764

Related U.S. Application Data
[63] Continuation of Ser. No. 832,152, June 11, 1969, abandoned.

[52] U.S. Cl............................ 29/523, 85/70, 138/89
[51] Int. Cl....................... B21d 39/00, B23p 11/02
[58] Field of Search................... 29/157.4, 401, 523; 138/89, 90; 85/70

[56] References Cited
UNITED STATES PATENTS

| | | | |
|---|---|---|---|
| 1,994,210 | 3/1935 | Shobert | 29/523 X |
| 2,821,323 | 1/1958 | Lee | 29/523 UX |
| 3,119,177 | 1/1964 | Knecht | 138/89 X |
| 3,451,583 | 6/1969 | Lee | 138/89 X |
| 3,525,365 | 8/1970 | Meulendyk | 138/89 |

FOREIGN PATENTS OR APPLICATIONS

| | | | |
|---|---|---|---|
| 538,132 | 11/1931 | Germany | 138/89 |

*Primary Examiner*—Charlie T. Moon
*Attorney*—Nelson Littell, Jr.

[57] ABSTRACT

Method for plugging up the back end of a pipe or bore exclusively accessible via its front end with the aid of a tubular body brought into the pipe or bore and expanded against its wall by means of a pulling device with a mandrel, previously inserted in the tubular body, the wall thickness of which has been minimised to such an extent at one end as to take up the active part of the mandrel, the tubular end concerned being sealed by a cap or the like.

1 Claim, 3 Drawing Figures

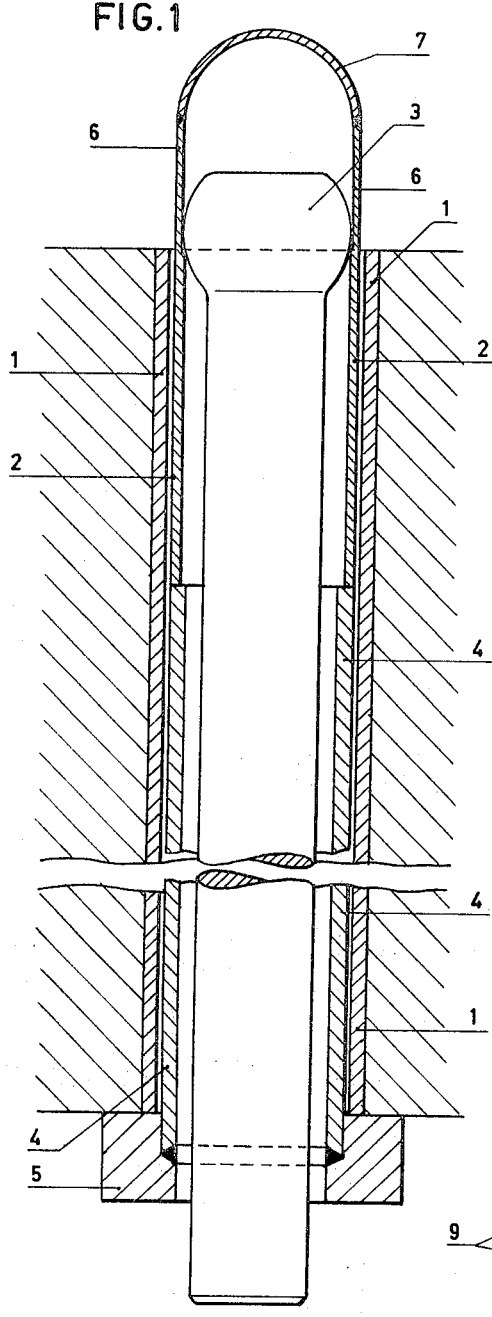
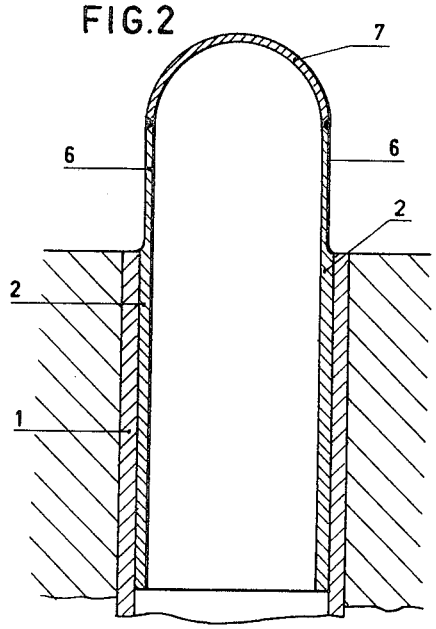
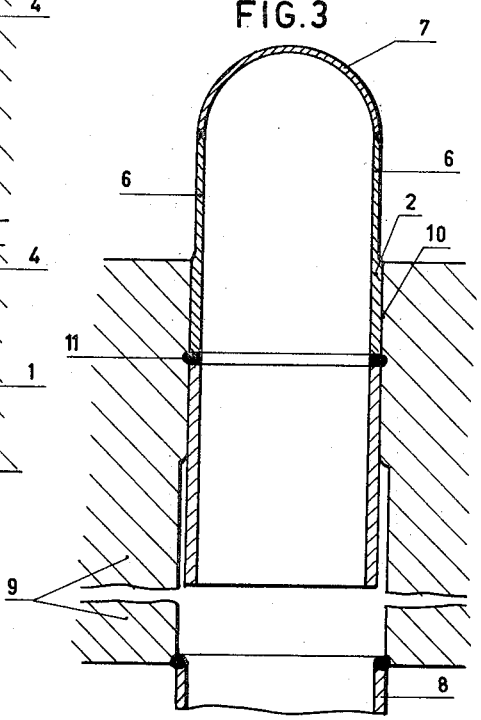
INVENTOR.
JOHANNES E. MEIJERS

METHOD OF PLUGGING A PIPE OR BORE ACCESSIBLE OF ONE SIDE ONLY

This is a continuation of Ser. No. 832,152, filed June 11, 1969 now abandoned.

The invention relates to a method for plugging up the back end of an elongated opening such as a pipe or bore exclusively accessible via its front end, a mandrel attached to the end of a draw-in-rod being pulled into a tubular body provided locally in the pipe or bore with the aid of a pulling device, as well as a device for carrying out the method.

Such methods are known in the art and have the drawback that the mandrel to be drawn into the tubular body, itself serves as a sealing plug in co-operation with the tubular body and consequently remains behind in the latter. This necessitates for the devices special provisions to detach or to sever the pulling device and the draw-in-rod from the pulling-up devices stated.

Further such sealing plugs are inadequate safeguards against leakage, which may be especially hazardous if it concerns a pipe or bore in a heat exchanger operating with a radioactive medium.

In the method according to the invention the above drawbacks are absent because the tubular body itself serves as the plugging-up device, as it is expanded in the pipe or bore to be plugged.

Therefore the method according to the invention is characterized in that the tubular body, with a mandrel previously inserted into it, is sealed at the back end, subsequently is locally brought into a pipe or bore and finally is expanded against the inner wall of the pipe or bore by pulling the mandrel through the entire length of the tubular body and thus removing it.

The device for carrying out the method is very simple because of all devices to be brought into a pipe or a bore only the tubular body remains behind.

Not only can the pulling device and the draw-in-rod be re-used several times, also the more or less complicated detachable and/or severable joints have been dispensed with.

The device according to the invention is characterized in that it comprises a tubular body, the wall thickness of which has been minimised to such an extent at one end along a sufficient distance that into the space concerned the active part of a mandrel can be just taken up and the tubular end provided with the active part of the mandrel, is provided with a sealing, such as a bottom, cap or the like.

When the tubulur body with the sealed end facing forward is locally brought into a pipe or bore with the aid of a pulling device, only the mandrel already present in the tubular body need to be pulled entirely through that part of the tubular body not minimised in wall-thickness in order to expand the mandrel against the inner wall of the pipe or bore.

When applying a metal plugging-up device in a metal pipe or bore as an extra provision the tubular body may be remotely welded from the inside locally to the inner wall of the plugged-up pipe or bore in ways such as known in the art.

Hereinafter the invention will further be elucidated with reference to the drawing, in which by way of example an embodiment is given.

In it:

FIG. 1 shows a cross-section through a plugging-up device with mandrel and pulling-device, provided together in a pipe;

FIG. 2 a cross-section through a plugging-up device expanded in a pipe end;

FIG. 3 a cross-section through a plugging-up device expanded in a bore in a tube-sheet of a heat exchanger designed for operating with a liquid metal.

In FIG. 1 by 1 a pipe is indicated, in which a plugging-up device 2 with mandrel 3 has been pushed to the end of pipe 1 with the aid of a press sleeve 4. The correct position of plugging-up device 2 in the pipe end is determined by the length of press sleeve 4 provided with a socket 5. The wall thickness of plugging-up device 2 is minimised along a short distance 6, so that a space is formed in which the active part of mandrel 3, which is just fitting in this space, is taken up. Thereafter this space is sealed by a small cap 7 welded on to it.

When mandrel 3 is pulled entirely through and out of plugging-up device 2, with the aid of a well-known pulling-device that is not shown in the drawing and that rests on socket 5 of press sleeve 4, the non-minimized wall is milled tight against the inner wall of pipe 1.

In FIG. 2 an example is given of a plugging-up device 2 milled tight in a pipe end.

Mandrel 3 has entirely been pulled through plugging-up device 2 and thereafter removed out of pipe 1 together with press sleeve 4.

In FIG. 3 a detail is given of a tube-sheet of a heat-exchanger designed for operating with a liquid metal, in which pipe 8 is welded against tube-sheet 9 immediately at its entrance into the latter.

According to the manner described above plugging-up device 2 has been brought from the front end through pipe 8 into bore 10 of pipe wall 9 and expanded in the latter. As an extra provision a weld connection 11 has been provided between plugging-up device 2 and bore 10 by remotely welding in a way as known per se in the art from the inner wall of plugging-up device 2 with the aid of automatic welding equipment without addition of welding material.

I claim:

1. A method for plugging the back end of an elongated opening such as a pipe or bore exclusively accessible by its front end which comprises the steps of pushing a one-piece cylindrical plug-up device of substantially the same diameter as said elongated opening and sealed at one end, said plug-up device having a decreased wall thickness adjacent said seal and a mandrel therein having a bulged head just fitting said decreased wall thickness, into and through said elongated opening to the point where said seal and at least part of said decreased wall thickness of said plug-up device extend at least to the back end of said elongated pipe and withdrawing said mandrel out the front end of said elongated opening while maintaining said plug-up device stationary in said elongated opening whereby the walls of said plug-up device are expanded.

* * * * *

UNITED STATES PATENT OFFICE
CERTIFICATE OF CORRECTION

Patent No. 3,762,034              Dated October 2, 1973

Inventor(s) Johannes E. Meijers

It is certified that error appears in the above-identified patent and that said Letters Patent are hereby corrected as shown below:

In Heading - "Assignee: N. V. Neratoom" should read

-- Assignee: B. V. Neratoom --. in heading, after Appln.

No. 233,764 insert -- Claims, Priority application

Netherlands, June 27, 1968, No. 68.09056 --.

Signed and sealed this 1st day of October 1974.

(SEAL)
Attest:

McCOY M. GIBSON JR.           C. MARSHALL DANN
Attesting Officer             Commissioner of Patents